US009784821B2

(12) United States Patent
Chung et al.

(10) Patent No.: US 9,784,821 B2
(45) Date of Patent: Oct. 10, 2017

(54) LASER SENSOR MODULE ARRAY FOR VEHICLE IDENTIFICATION, SPEED MONITORING AND TRAFFIC SAFETY APPLICATIONS

(71) Applicants: LASER TECHNOLOGY, INC., Centennial, CO (US); KAMA-TECH (HK) LIMITED, Tsim Sha Tsui (CN)

(72) Inventors: Jiyoon Chung, Aurora, CO (US); Jeremy Dunne, Parker, CO (US)

(73) Assignees: LASER TECHNOLOGY, INC., Centennial, CO (US); KAMA-TECH (HK) LIMITED, Tsim Sha Tsui (HK)

( * ) Notice: Subject to any disclaimer, the term of this patent is extended or adjusted under 35 U.S.C. 154(b) by 203 days.

(21) Appl. No.: 14/791,188

(22) Filed: Jul. 2, 2015

(65) Prior Publication Data
US 2017/0003381 A1    Jan. 5, 2017

(51) Int. Cl.
| G01S 17/00 | (2006.01) |
| G01S 7/481 | (2006.01) |
| G01S 17/10 | (2006.01) |
| G01S 17/58 | (2006.01) |
| G01S 17/87 | (2006.01) |

(52) U.S. Cl.
CPC ............ *G01S 7/4813* (2013.01); *G01S 17/10* (2013.01); *G01S 17/58* (2013.01); *G01S 17/87* (2013.01)

(58) Field of Classification Search
CPC ......... G08G 1/01; G08G 1/065; G01S 7/4815
USPC ................ 250/221, 559.13, 559.19, 559.32; 340/557, 942; 356/639
See application file for complete search history.

(56) References Cited

U.S. PATENT DOCUMENTS

| 5,886,660 | A | 3/1999 | Loewenstein | |
| 6,212,468 | B1 * | 4/2001 | Nakayama | G08G 1/04 340/933 |
| 6,965,438 | B2 | 11/2005 | Lee et al. | |
| 7,405,676 | B2 * | 7/2008 | Janssen | G08G 1/01 250/224 |
| 2007/0153862 | A1 | 7/2007 | Shchegrov et al. | |
| 2009/0015846 | A1 | 1/2009 | Erfling et al. | |

OTHER PUBLICATIONS

International Search Report and Written Opinion for International application No. PCT/US2016/036058, dated Sep. 13, 2016, 8 pages.

* cited by examiner

*Primary Examiner* — Kevin Pyo
(74) *Attorney, Agent, or Firm* — Hogan Lovells US LLP

(57) ABSTRACT

A laser sensor module array for vehicle identification, speed monitoring and traffic safety applications. Each of the laser sensor modules comprise a laser signal transmitting and receiving port with the array comprising a basic row of N laser sensor modules, wherein N is greater than 1 and wherein each of the N laser sensor modules in the basic row is displaced at an acute angle with respect to adjacent ones of the laser sensor modules. An additional row of N laser sensor modules may adjoin the basic row of N laser sensor modules in a parallel or acute angular relationship to corresponding ones in the basic row.

8 Claims, 5 Drawing Sheets

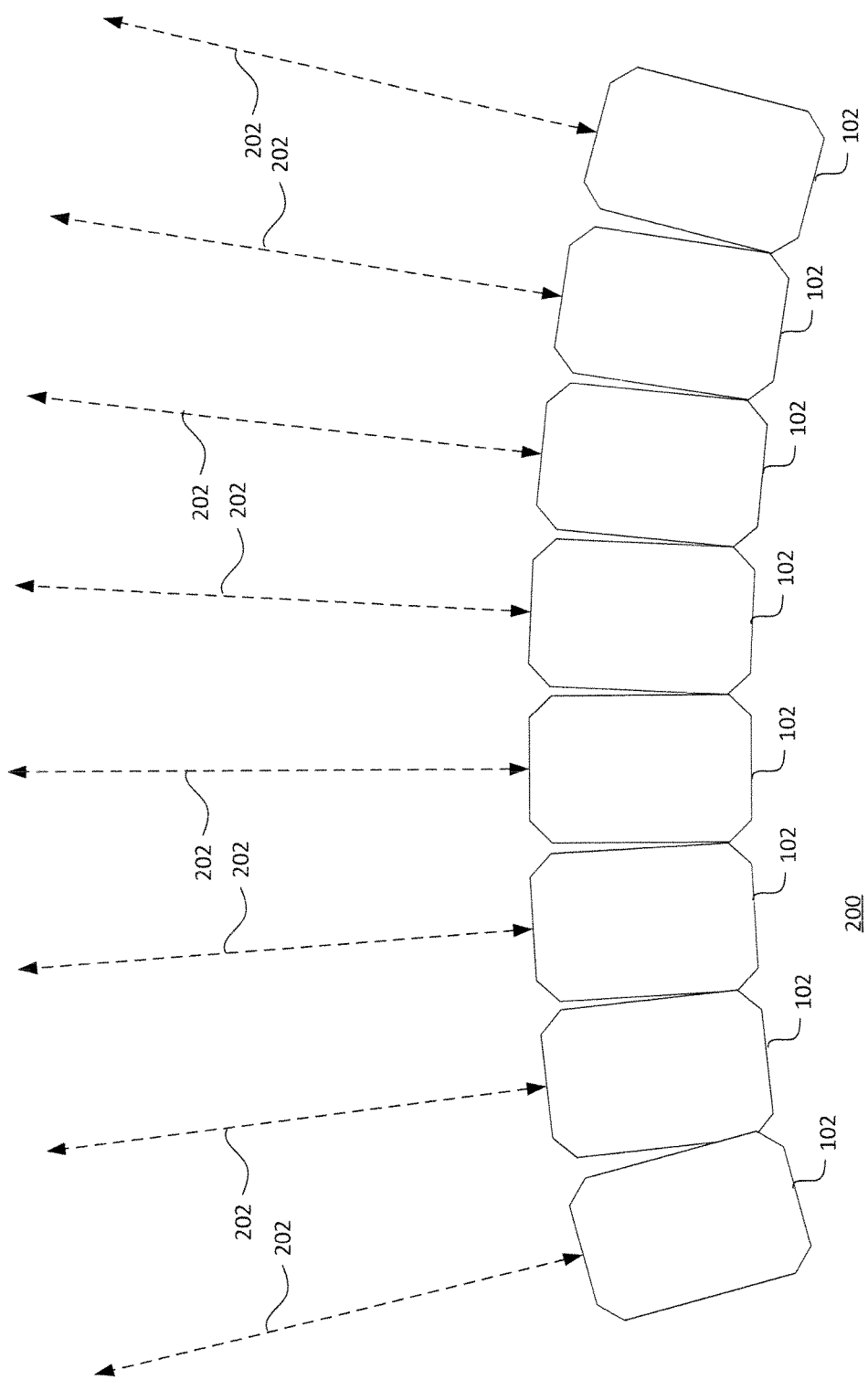

LASER SENSOR MODULE ARRAY FOR VEHICLE IDENTIFICATION, SPEED MONITORING AND TRAFFIC SAFETY APPLICATIONS

BACKGROUND OF THE INVENTION

The present invention relates, in general, to the field of laser rangefinding and speed measurement instruments. More particularly, the present invention relates to a laser sensor module array for vehicle identification, speed monitoring and traffic safety applications.

Police have been using radar and laser speed measurement devices to determine vehicle speed in traffic enforcement operations for many years now. With respect to radar based devices, they generally function such that a microwave signal is emitted toward a moving vehicle and a reflection from the target returned to the device which then uses the determined Doppler shift in the return signal to determine the vehicle's speed. Radar based devices have an advantage over handheld laser based devices in that they emit a very broad signal cone of energy and do not therefore, require precise aiming at the target vehicle. As such, they are well suited for fixed and mobile applications while requiring little, if any, manual operator aiming of the device.

On the other hand, laser based devices employ the emission of a series of short pulses comprising a very narrow beam of monochromatic laser energy and then measure the flight time of the pulses from the device to the target vehicle and back. These laser pulses travel at the speed of light which is on the order of 984,000,00 ft/sec. or approximately 30 cm/nsec. Laser based devices then very accurately determine the time from when a particular pulse was emitted until the reflection of that pulse is returned from the target vehicle and divide it by two to determine the distance to the vehicle. By emitting a series of pulses and determining the change in distance between samples, the speed of the vehicle can be determined very quickly and with great accuracy.

U.S. Pat. No. 6,965,438 describes a vehicle measuring system incorporating a number of laser distance sensors mounted in a fixed, linear arrangement over a roadway to enable the height and width of vehicles passing thereunder to be determined, for example, in a toll collection system. The system described requires an overhead structure spanning all lanes of a roadway rendering it undesirable for multilane applications while concomitantly necessitating the provision of a large number of laser distance sensors in order to accurately assess the varying height and width dimensions of all vehicles passing under the system. Still further, the vehicle measuring system described does not contemplate or disclose the determination of vehicle speed.

Laser Technology, Inc., assignee of the present invention, designs, manufactures and sells laser based traffic sensors such as the TruSense™ T100 and T200 devices. In a particular implementation of a speed system incorporating these sensors, two sensors may be utilized in conjunction with a spacer bar in which the devices are separated by approximately 80 cm longitudinally adjacent a roadway. With appropriate processing circuitry, a vehicle's presence triggering a first of the two sensors initiates a timer, which followed by the vehicle's triggering of the second sensor, enables the speed of the vehicle to be determined with a resolution of 1 mph. Such a system can also be utilized to count, profile and classify vehicles, determine the separation between vehicles as well as calculating their speed.

SUMMARY OF THE INVENTION

Disclosed herein is a laser sensor module array for vehicle identification, speed monitoring and traffic safety applications. A system in accordance with the present invention does not require an overhead structure for a very large number of laser distance sensors as depicted in the foregoing U.S. Pat. No. 6,965,438. Moreover, the system disclosed herein requires no beam spreader and can provide better all-weather performance than existing systems.

The laser sensor module array of the present invention may be conveniently combined with a still image or video sensor system for automatic number plate recognition (ANPR) applications as well as law enforcement officer or construction zone safety implementations.

A laser sensor module array in accordance with the present invention may be configured in either fixed or mobile patrol car applications.

Particularly disclosed herein is an array of laser sensor modules, wherein each of the laser sensor modules comprises a laser signal transmitting and receiving port. The array comprises a basic row of N laser sensor modules, wherein N is greater than 1 and wherein each of the N laser sensor modules in the basic row is displaced parallel with, and at an acute angle with respect to, adjacent ones of the laser sensor modules in that basic row.

In a particular implementation of the present invention, the array of laser sensor modules may further comprise an additional row of N laser sensor modules adjoining the basic row of N laser sensor modules and wherein each of said N laser sensor modules in the additional row is displaced parallel with, and at an acute angle with respect to, adjacent ones of the laser sensor modules in that additional row. As used herein, it should be noted that the N laser sensor modules in the basic row need not be the same number of laser sensor modules as the N number of laser sensor modules in the additional row.

In still other implementations of the present invention, certain of the N laser sensor modules in the basic row may be configured in a substantially parallel relationship to corresponding ones of the N laser sensor modules in the additional row or, alternatively, at an acute angle with respect thereto. Alternatively, the N laser sensor modules in the additional row may be disposed interstitially of the laser sensor modules in the basic row either parallel or interstitially with respect thereto.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 2A is a top plan view illustrative of a laser sensor array such as that depicted in the preceding figure showing a possible angular displacement between adjacent laser sensors in an array in accordance with an embodiment of the present invention comprising a basic row of laser sensors;

DESCRIPTION OF A REPRESENTATIVE EMBODIMENT

Figure 1:
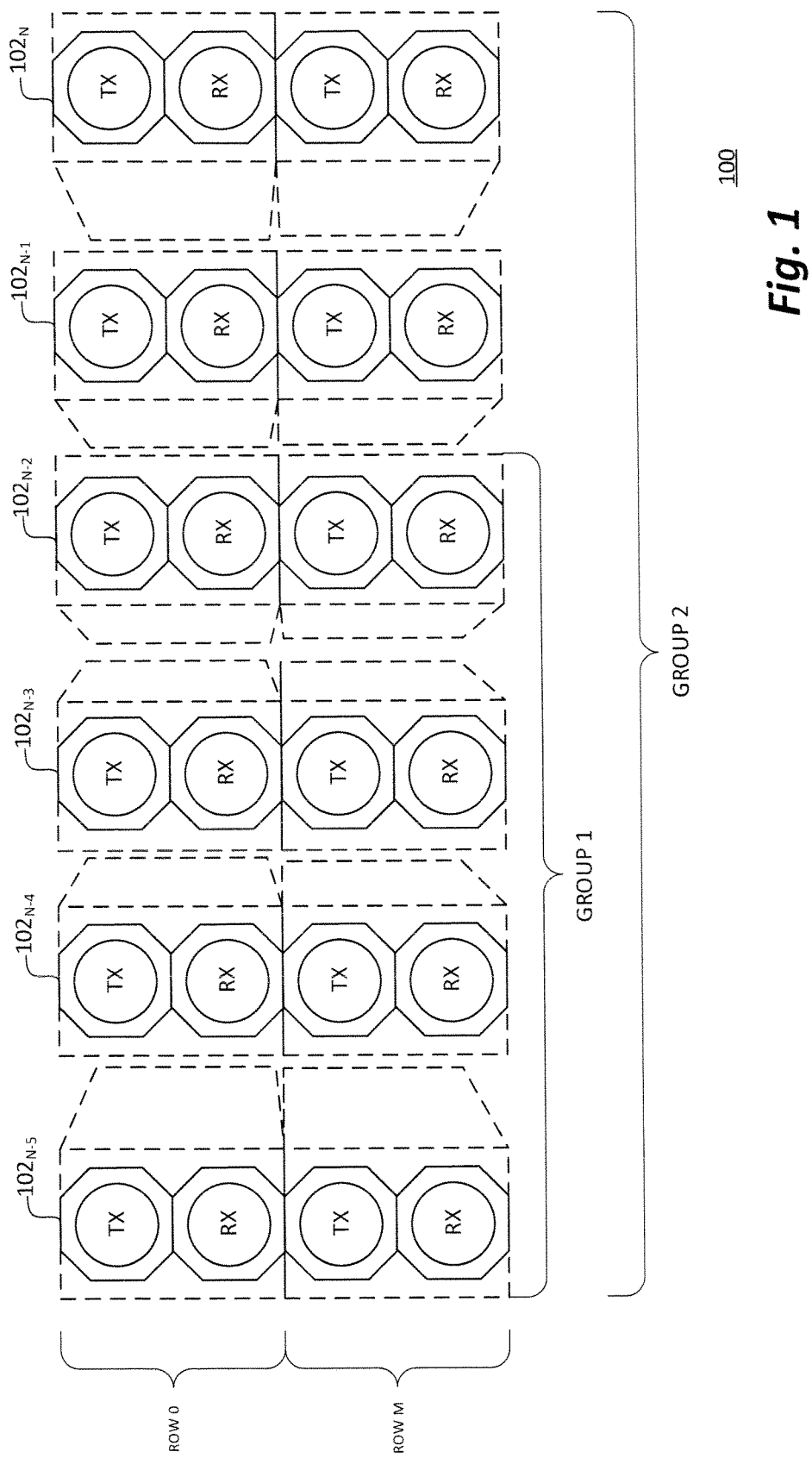
FIG. 1 is a simplified, perspective view of a laser sensor array in accordance with an embodiment of the present invention illustrative of various array implementations including, for example, one or more vertical rows and four, six, eight or more horizontal groupings.

With reference now to FIG. 1, a simplified, perspective view of a laser sensor array 100 in accordance with an embodiment of the present invention is shown. The laser sensor array 100 comprises an array, or matrix, of one or more rows (Rows 0 through M) of laser sensor modules $102_{N-5}$ to $102_N$ such as, for example, TruSense™ T100 and/or T200 traffic sensors available from Laser Technology, Inc., Centennial, Colo., assignee of the present invention. The laser sensor modules 102 of the laser sensor array 100 may be grouped, for example, in groups of four (Group 1), six (Group 2), eight (not illustrated), sixteen (not illustrated) or more as a particular application might require. Each of the laser sensor modules 102 comprises a laser signal transmission port (TX) and a reflected laser signal reception port (RX) as illustrated.

Although the laser sensor modules 102 are illustrated as being mounted in substantially parallel relationship to one another, in a representative embodiment the individual laser sensor modules 102 in each row may be configured at an angle with respect to adjacent laser sensor modules in that row and/or also at an angle with respect to laser sensor modules 102 in a differing row.

Figure 2B:
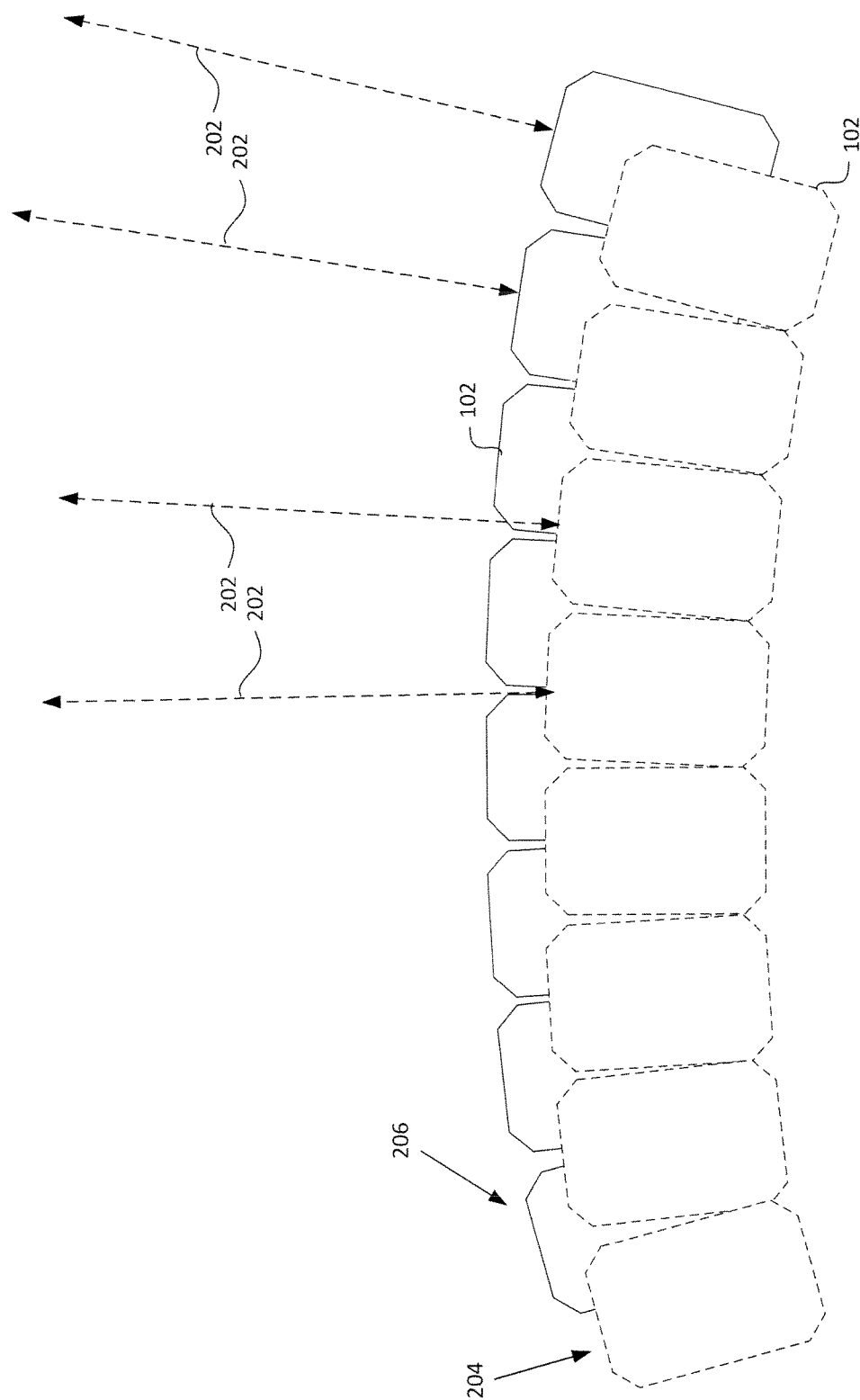
FIG. 2B is a top plan view illustrative of a laser sensor array comprising the basic row of laser sensors of the preceding figure in conjunction with an additional row of laser sensors displaced interstitially in a staggered configuration with respect to those in the basic row.

With reference additionally now to FIG. 2A, a top plan view of a laser sensor array 200 is shown, such as that depicted in the preceding figure, illustrating a possible angular displacement between adjacent laser sensor modules 102 in an array in accordance with an embodiment of the present invention. Although only a single, basic row of laser sensor modules 102 is shown, it should be noted that an additional row may be incorporated in conjunction with the laser sensor array 200 having the same or differing angular displacement with respect to the illustrated row and/or with respect to each other as illustrated, for example, in FIG. 2B wherein a basic row 204 is shown in dashed outline in conjunction with an additional row 206. As illustrated, each of the laser sensor modules 102 emit a laser signal (e.g. a pulsed laser signal; TX) toward a target and receive at least a portion of the emitted signal back as reflected by the target (RX). The paths of the emitted and reflected laser signals for each of the laser sensor modules 102 are indicated along separate laser signal lines 202.

In a representative embodiment, the laser sensor modules 102 may be arranged, for example, with an angular displacement of 0.3° with respect to adjacent ones of the laser sensor modules 102. Such an angular displacement would provide a laser signal line 202 spread of approximately 0.8 meters at a distance of 154 meters. It should be noted that the angular displacement with respect to adjacent ones of the laser sensor modules 102 may be advantageously increased or decreased from this value depending upon the number or width of the lanes of the roadway to be monitored and the distance from the laser sensor array to the roadway itself. The smaller the angular displacement with respect to adjacent ones of the laser sensor modules 102, the more overlap of the laser signal lines 202 will be experienced with the concomitant capability of determining more information monitored in a given lane of the roadway.

Figure 3:
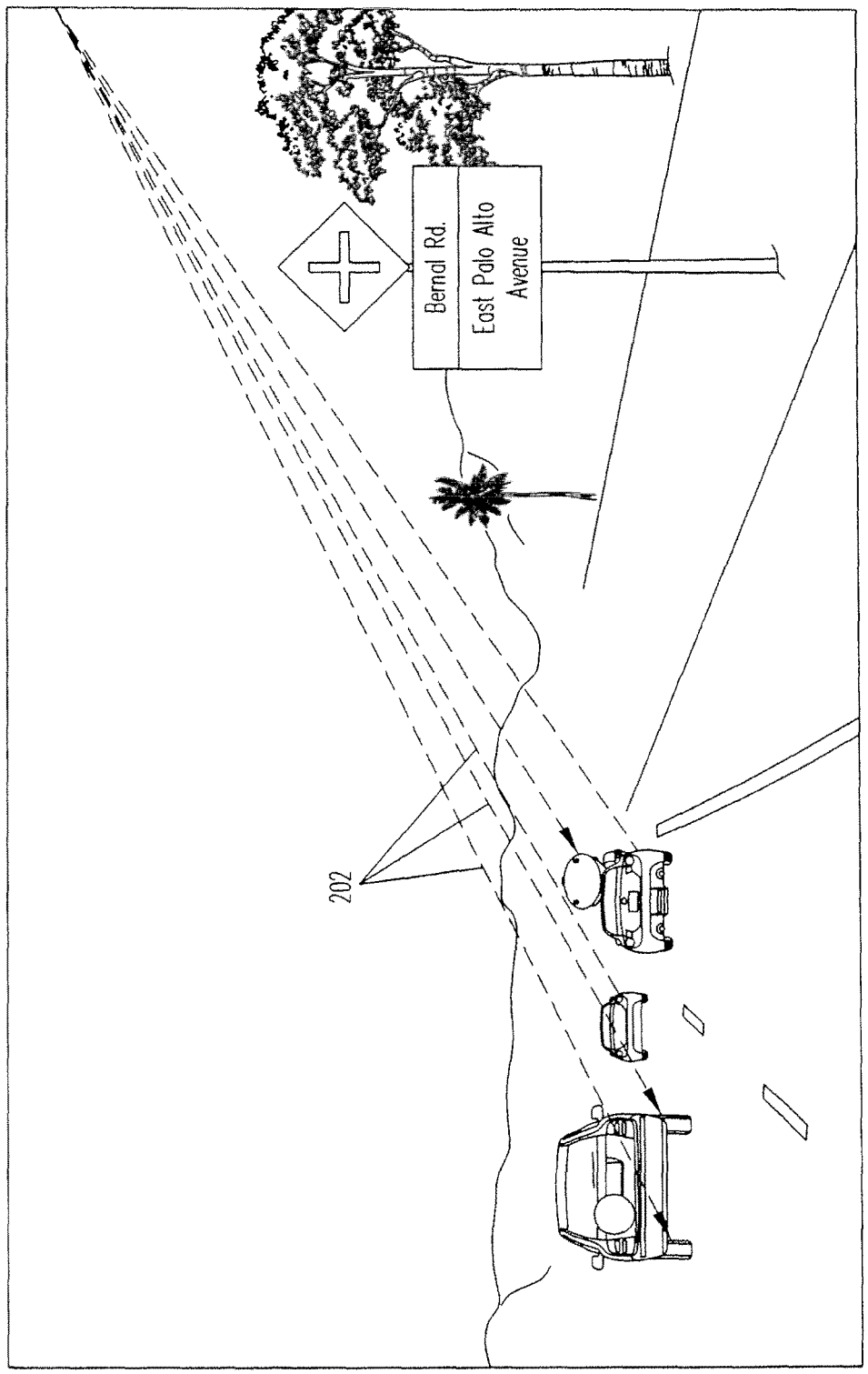
FIG. 3 is a representative view of a multilane roadway wherein a laser sensor array in accordance with the present invention is mounted above and to one side of the roadway for vehicle identification and speed monitoring and/or traffic safety applications.

With reference additionally now to FIG. 3, a representative view of a multilane roadway 300 is shown wherein a laser sensor array in accordance with the present invention is mounted above and to one side of the roadway for vehicle identification and speed monitoring and/or traffic safety applications. Laser signal lines 202 emitted from, and reflected back from the vehicles on the roadway 300 to a laser sensor array 100 (FIG. 1) are shown. With laser sensor modules 102 in a laser sensor array 100 displaced at an exemplary angle of 0.3° with respect to each other, a spread of substantially 0.8 m results at a distance of about 154 m. Use of the laser sensor array 100 enables the system to be mounted to the side of the multilane roadway 300, obviating the necessity of a very large overhead structure as described previously with respect to U.S. Pat. No. 6,965,438.

The laser sensor array 100 of the present invention requires no beam spreader and provides better performance in vehicle identification, speed monitoring and traffic safety applications than existing approaches. With particular reference to law enforcement officer or construction zone safety applications, the laser sensor array 100 may also be combined with a video monitoring system or utilized in conjunction with automatic number plate recognition systems. Still further, a laser sensor array 100 in accordance with the present invention may also be utilized in mobile patrol car implementations in addition to the representative fixed installation illustrated.

Figure 4:
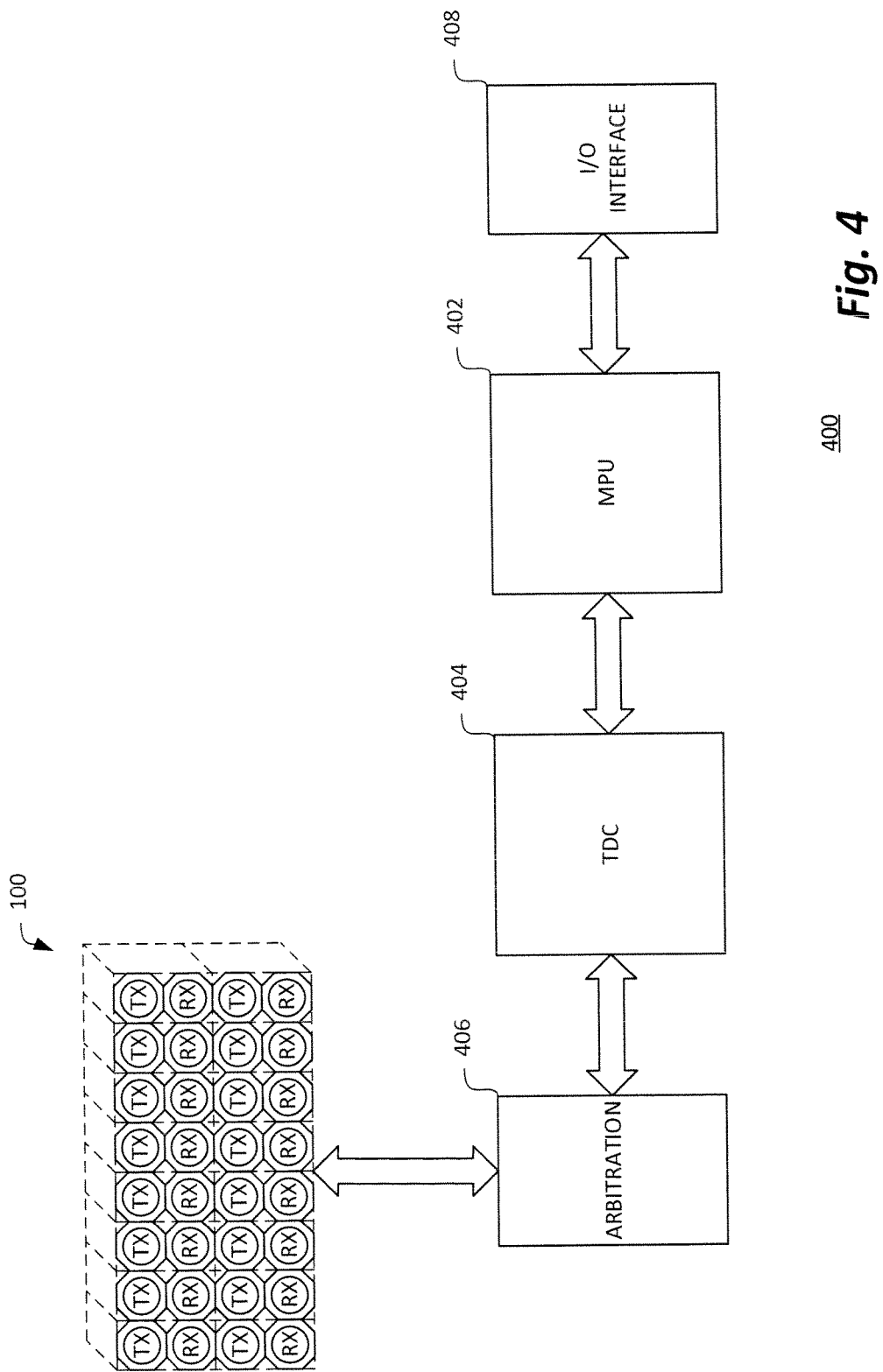
FIG. 4 is a simplified functional block diagram for one possible implementation of the control circuitry for a laser sensor array in accordance with the present invention.

With reference additionally now to FIG. 4, a simplified functional block diagram for one possible implementation of the control circuitry 400 of a laser sensor array 100 in accordance with the present invention is shown. A processor, such as microprocessor (MPU) 402, is coupled to a time-to-digital converter (TDC) 404. The microprocessor 402 may be a high performance device in the range of 120 MHz to 200 MHz while the time-to-digital converter 404 may comprise a field programmable gate array (FPGA) device with a 400 MHz high speed digital clock. This then provides pulses of 2.5 nanoseconds providing a resolution of 37.5 centimeters. At 1024 taps per digital clock would then provide 0.366 millimeter resolution. Multiple rings can also be provided for better accuracy if desired.

The time-to-digital converter 404 is coupled to an arbitration block 406 which functions to control the individual laser sensor modules 102 (not shown) of the laser sensor array 100 to preclude operational interference between the laser sensor modules 102 of the laser sensor array 100. The microprocessor 402 is also coupled to a high speed input/output (I/O) interface 408 which may comprise, for example, a universal serial bus (USB), Ethernet, serial port, Bluetooth, other near field communication (NFC) or other interface to user input and output devices in addition to functioning as real-time trigger outputs for still image or video sensors.

As mentioned previously with respect to the function of the arbitration block 406, there exists the potential for interference between and among the individual laser sensor modules 102 of the laser sensor array 100. In order to minimize this possible interference (or cross-talk), a mechanical structure may be devised to preclude cross-talk of the RX signals or a sequence machine can be implemented to control the laser emission (TX) of the individual laser sensor modules 102. Such a sequence machine may be implemented, for example, in the form of a cell planning algorithm (such as those utilized in cellular telephony) in both space and/or time in order to provide optimum performance and minimize potential cross-talk.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. An array of laser sensor modules for roadway monitoring applications, each of said laser sensor modules comprising a laser signal transmitting and receiving port, said array comprising:

a basic row of N laser sensor modules, wherein N is greater than 1 and wherein each of said N laser sensor modules in said basic row is displaced outwardly at an acute angle with respect to adjacent ones of said laser sensor modules in said basic row; and an additional row of N laser sensor modules adjoining said basic row of N laser sensor modules and wherein each of said N laser sensor modules in said additional row is displaced outwardly at an acute angle with respect to adjacent ones of said laser sensor modules in said additional row.

2. The array of laser sensor modules of claim 1 wherein said N laser sensor modules in said basic row are configured in a substantially parallel relationship to corresponding ones of said N laser sensor modules in said additional row.

3. The array of laser sensor modules of claim 1 wherein said N laser sensor modules in said additional row are configured in an acute angle with respect to corresponding ones of said N laser sensor modules in said basic row.

4. The array of laser sensor modules of claim 1 wherein said N laser sensor modules in said additional row are configured in substantially parallel and interstitial relationship with respect to said N laser sensor modules in said basic row.

5. The array of laser sensor modules of claim 1 wherein said N laser sensor modules in said additional row are displaced at an acute angle with respect to said N laser sensor modules in said basic row and in an interstitial relationship thereto.

6. The array of laser sensor modules of claim 1 further comprising:

an arbitration block coupled to said array for operatively controlling individual ones of said N laser sensor modules to preclude interference with others of said N laser sensor modules.

7. The array of laser sensor modules of claim 6 further comprising:

a processor; and a time-to-digital converter coupled to said processor and said arbitration block.

8. The array of laser sensor modules of claim 7 further comprising: an input/output interface coupled to said processor.

* * * * *